United States Patent
Jung et al.

(10) Patent No.: US 10,893,268 B2
(45) Date of Patent: Jan. 12, 2021

(54) METHOD OF VIDEO CODING BY PREDICTING THE PARTITIONING OF A CURRENT BLOCK, A DECODING METHOD, AND CORRESPONDING CODING AND DECODING DEVICES AND COMPUTER PROGRAMS

(71) Applicant: Orange, Paris (FR)

(72) Inventors: Joel Jung, Le Mesnil Saint Denis (FR); Kartik Viswanathan, Rennes (FR)

(73) Assignee: ORANGE, Paris (FR)

( * ) Notice: Subject to any disclaimer, the term of this patent is extended or adjusted under 35 U.S.C. 154(b) by 426 days.

(21) Appl. No.: 14/413,977

(22) PCT Filed: Jul. 8, 2013

(86) PCT No.: PCT/FR2013/051625
§ 371 (c)(1),
(2) Date: Jan. 9, 2015

(87) PCT Pub. No.: WO2014/009644
PCT Pub. Date: Jan. 16, 2014

(65) Prior Publication Data
US 2015/0208067 A1  Jul. 23, 2015

(30) Foreign Application Priority Data

Jul. 9, 2012 (FR) .................... 12 56604

(51) Int. Cl.
*H04N 19/96* (2014.01)
*H04N 19/119* (2014.01)
(Continued)

(52) U.S. Cl.
CPC ......... *H04N 19/119* (2014.11); *H04N 19/159* (2014.11); *H04N 19/176* (2014.11);
(Continued)

(58) Field of Classification Search
CPC .. H04N 19/119; H04N 19/159; H04N 19/176; H04N 19/192; H04N 19/463;
(Continued)

(56) References Cited

U.S. PATENT DOCUMENTS

| 5,351,095 A | 9/1994 | Kerdranvat |
| 7,499,492 B1 | 3/2009 | Ameres et al. |

(Continued)

FOREIGN PATENT DOCUMENTS

| WO | 2011046607 A2 | 4/2011 |
| WO | 2011061089 A1 | 5/2011 |

(Continued)

OTHER PUBLICATIONS

Bross, Benjamin et al: "High Efficiency Video Coding (HEVC) Text Specification Draft 6", Joint-Collaborative Team on Video Coding (JCT-VC), Document JCTVC-H1003, San Jose, CA, USA, Feb. 2012.

(Continued)

*Primary Examiner* — Jamie J Atala
*Assistant Examiner* — Patrick E Demosky
(74) *Attorney, Agent, or Firm* — David D. Brush; Westman, Champlin & Koehler, P.A.

(57) ABSTRACT

A method is provided for coding a current image that has previously been partitioned into blocks. The method includes, for a current block that is to be coded: partitioning the current block at least once into a plurality of subblocks; and representing) the partitioning of current block in the form of a first digital information sequence. The coding method further includes predicting the partitioning of the current block relative to the partitioning of a block that has already been coded and then decoded and that is represented in the form of a second digital information sequence, by comparing the first and second sequences with each other or (Continued)

by comparing the corresponding partitionings with each other, and then by determining residual digital information representative of the comparison in application of a predetermined comparison criterion; and encoding the residual digital information as determined.

11 Claims, 7 Drawing Sheets

(51) Int. Cl.
*H04N 19/463* (2014.01)
*H04N 19/192* (2014.01)
*H04N 19/159* (2014.01)
*H04N 19/176* (2014.01)
*H04N 19/50* (2014.01)
*H04N 19/597* (2014.01)
*H04N 19/46* (2014.01)
*H04N 19/147* (2014.01)

(52) U.S. Cl.
CPC ......... *H04N 19/192* (2014.11); *H04N 19/463* (2014.11); *H04N 19/50* (2014.11); *H04N 19/147* (2014.11); *H04N 19/46* (2014.11); *H04N 19/597* (2014.11)

(58) Field of Classification Search
CPC ...... H04N 19/50; H04N 19/147; H04N 19/46; H04N 19/597; H04N 19/61; H04N 19/136; H04N 19/70
See application file for complete search history.

(56) References Cited

U.S. PATENT DOCUMENTS

| | | | | |
|---|---|---|---|---|
| 2011/0274170 A1* | 11/2011 | Paz | ...................... | H04N 19/176 |
| | | | | 375/240.13 |
| 2011/0310976 A1* | 12/2011 | Wang | ................... | H04N 19/176 |
| | | | | 375/240.24 |
| 2012/0269274 A1* | 10/2012 | Kim | ...................... | H04N 19/176 |
| | | | | 375/240.24 |
| 2014/0240456 A1* | 8/2014 | Kang | ................... | H04N 19/597 |
| | | | | 348/42 |
| 2015/0049817 A1* | 2/2015 | Liu | ......................... | H04N 19/13 |
| | | | | 375/240.16 |
| 2015/0208067 A1* | 7/2015 | Jung | ..................... | H04N 19/119 |
| | | | | 375/240.02 |

FOREIGN PATENT DOCUMENTS

| | | | | |
|---|---|---|---|---|
| WO | WO 2011061089 A1 * | 5/2011 | ........... | H04N 19/105 |
| WO | 2011127966 A1 | 10/2011 | | |
| WO | WO 2011127966 A1 * | 10/2011 | ........... | H04N 19/597 |

OTHER PUBLICATIONS

International Search Report and Written Opinion dated Sep. 30, 2013 for corresponding International Patent Application No. PCT/FR2013/051625, filed Jul. 8, 2013.

Chia-Yuan Teng et al: "A New Quadtree Predictive Image Coder", Proceedings of the International Conference on Image Processing. (ICIP). Washington, Oct. 23-26, 19956; vol. 2, Oct. 23, 1995, pp. 73-76, XP010196975.

Merkle P. Et al: "The Effects of Multiview Depth Video Compression on Multiview Rendering," Signal Processing, Image Communication, Elsevier Science Publishers, Amsterdam, NL, vol. 24, No. 1-2, Jan. 1, 2009, pp. 73-88, XP025884346.

* cited by examiner

METHOD OF VIDEO CODING BY PREDICTING THE PARTITIONING OF A CURRENT BLOCK, A DECODING METHOD, AND CORRESPONDING CODING AND DECODING DEVICES AND COMPUTER PROGRAMS

CROSS-REFERENCE TO RELATED APPLICATIONS

This Application is a Section 371 National Stage Application of International Application No. PCT/FR2013/051625, filed Jul. 8, 2013, the content of which is incorporated herein by reference in its entirety, and published as WO 2014/009644 on Jan. 16, 2014, not in English.

FIELD OF THE INVENTION

The present invention relates in general to the field of image processing and more particularly to coding digital images and digital image sequences.

The invention can thus apply in particular to the video coding performed by present-day and future video coders (ITU-T/ISO MPEG HEVC), and extensions thereto.

BACKGROUND OF THE INVENTION

The HEVC standard that is currently being prepared and that is described in the document by: B. Bross, W. J Han, J. R. Ohm, G. J. Sullivan, and T. Wiegand, entitled "High efficiency video coding (HEVC) text specification draft 6", Document JCTVC-H1003 of JCT-VC, San Jose, Calif., USA, February 2012; is similar to the preceding H.264 standard in the sense that it makes use of block partitioning of the video sequence. Nevertheless, the HEVC standard differs from the H.264 standard by the fact that the partitioning that is used complies with a tree structure referred to as a "quadtree". For that purpose, and as shown in FIG. 1A, a current image $I_N$ is partitioned initially into a plurality of square blocks $CTB_1, CTB_2, \ldots, CTB_i, \ldots, CTB_L$ ($1 \leq i \leq L$), e.g. having a size of 64×64 pixels. For a given block $CTB_i$, it is considered that the block constitutes the root of a coding tree in which:

a first level of leaves under the root corresponds to a first depth level in the partitioning of the block $CTB_i$ for which the block $CTB_i$ has already been partitioned a first time into a plurality of coding blocks;

a second level of leaves under the first level of leaves corresponds to a second depth level in the partitioning of the block $CTB_i$, for which the block $CTB_i$ that has already been partitioned a first time is partitioned a second time into a plurality of coding blocks, . . . ; and . . . a $k^{th}$ level of leaves under the $k-1^{th}$ level of leaves, which corresponds to a $k^{th}$ depth level in the partitioning of blocks $CTB_i$ for which the block $CTB_i$ that has been partitioned k−1 times is partitioned one last time into a plurality of coding blocks.

In an HEVC compatible coder, the partitioning of the block $CTB_i$ is iterated to a predetermined partitioning depth level.

At the end of the above-mentioned successive partitionings of the block $CTB_i$, as shown in FIG. 1A, it is partitioned in the end into a plurality of coding blocks written $CB_1, CB_2, \ldots, CB_j, \ldots, CB_M$ with $1 \leq j \leq M$.

The size of said coding blocks may be selected in adaptive manner with the help of block partitioning complying with a quadtree type structure in which the leaves of the tree structure represent respectively the coding blocks $CB_1, CB_2, \ldots, CB_j, \ldots, CB_M$ obtained at various partitioning depth levels.

With reference to FIG. 1A, for a given block $CB_j$, it is considered that the block constitutes the root of a prediction and transformation tree of said block, e.g. of the discrete cosine transform (DCT) type. The prediction tree of a given block $CB_j$ is representative of the way in which the block $CB_j$ is partitioned into a plurality of blocks $PB_1, PB_2, \ldots, PB_t, \ldots, PB_P$ ($1 \leq t \leq P$) that are referred to as "prediction blocks". For a prediction block $PB_t$ under consideration, prediction parameters such as for example the coding mode, the movement vectors, etc., are specified in a prediction unit.

There exist various partitioning modes for a coding block $CB_j$ under consideration. By way of example, FIG. 1A shows the various partitioning modes for the coding block $CB_j$ under consideration in the context of a prediction INTER thereof. There are four of these partitioning modes:

the PART_2N×2N mode corresponds to no partitioning of the coding block $CB_j$ under consideration, which thus corresponds to a single prediction block $PB_1$;

the PART_2N×N mode corresponds to partitioning of the coding block $CB_j$ under consideration horizontally into two rectangular prediction blocks $PB_1$ and $PB_2$;

the PART_N×2N mode corresponds to partitioning of the coding block $CB_j$ under consideration vertically into two rectangular prediction blocks $PB_1$ and $PB_2$; and the PART_N×N mode corresponds to partitioning of the coding block $CB_j$ under consideration into four square prediction blocks $PB_1, PB_2, PB_3,$ and $PB_4$, which are of the same size.

After predictive coding of the coding block $CB_j$ under consideration, it may be partitioned once more into a plurality of smaller blocks $TB_1, TB_2, \ldots, TB_v, \ldots, TB_Q$ ($1 \leq v \leq Q$) which are referred to as "transform" blocks. Such partitioning complies with a quadtree structure known as a "residual quadtree" in which the leaves represent the respective coding blocks $TB_1, TB_2, \ldots, TB_v, \ldots, TB_Q$ obtained at the various partitioning depth levels.

FIG. 1A shows an example of partitioning the coding block $CB_j$ that was predicted with the help of PART_N×N partitioning. In the example shown, the blocks $PB_2$ and $PB_3$ of the coding block $CB_j$ are themselves each partitioned by way of example into four smaller square blocks that are of the same size, respectively $TB_1, TB_2, TB_3,$ & $TB_4$ and $TB_5, TB_6, TB_7,$ & $TB_8$. Such partitioning is shown in dashed lines in FIG. 1A.

FIG. 1B shows an example of partitioning a block $CTB_i$ under consideration that was obtained after predictive coding and transform coding thereof, together with the corresponding partitioning tree structure. In the example shown:

the block $CTB_i$, which is considered as the root of the coding tree, is drawn in continuous bold lines;

the coding blocks $CB_1$ to $CB_{16}$ which constitute firstly the leaves of the coding tree and secondly the roots of the residual quadtree are drawn in continuous fine lines; and the transform blocks $TB_1$ to $TB_{16}$, which constitute the leaves of the residual quadtree are drawn in dashed lines.

In the tree structure constituted in this way, there exist:

a first partitioning depth level NP1, which contains coding blocks only, such as the coding blocks $CB_1$ to $CB_4$;

a second partitioning depth level NP2, which contains:

coding blocks such as the blocks $CB_5$ to $CB_8$ obtained as a result of partitioning the block $CB_1$, and blocks $CB_8$ to $CB_{12}$ obtained as a result of partitioning the block $CB_4$; and transform blocks such as the blocks $TB_1$ to $TB_4$ obtained as a result of partitioning the block $CB_2$; and a third partitioning depth level NP3, which contains:
coding blocks such as the blocks $CB_{13}$ to $CB_{16}$ obtained as a result of partitioning the block $CB_{10}$; and transform blocks such as: the blocks $TB_5$ to $TB_8$ obtained as a result of partitioning the block $CB_7$; the blocks $TB_9$ to $TB_{12}$ obtained as a result of partitioning the block $TB_2$; and the blocks $TB_{12}$ to $TB_{16}$ obtained as a result of partitioning the block $CB_{12}$.

In an HEVC compatible coder, for a block $CTB_i$ under consideration, a plurality of different partitionings for that block are put into competition in the coder, i.e. different respective combinations of partitioning iterations are put into competition, in order to select the best partitioning, i.e. the partitioning that optimizes the coding of the block $CTB_i$ under consideration in application of a predetermined coding performance criterion, e.g. the data rate/distortion cost or an efficiency/complexity compromise, which are criteria well known to the person skilled in the art.

Once optimum partitioning of a block $CTB_i$ under consideration has been performed, a digital information sequence, e.g. a run of bits, that is representative of this optimum partitioning is transmitted in a stream that is to be read by a video decoder.

Such a stream likewise comprises:
residual data constituted by the coefficients of the quantified residual block and optionally, when performing inter mode coding, residual data concerning movement vectors; and coding parameters that are representative of the coding mode used, and in particular:
the prediction mode (intra prediction, inter prediction, default prediction performing prediction for which no information is transmitted to the decoder, i.e. "skipping");
information specifying the type of prediction (orientation, reference image component, . . . );
the type of transform, e.g. 4×4 DCT, 8×8 DCT, etc.
movement information, where necessary;
etc.

In certain circumstances, it can happen that the partitioning into a plurality of subblocks as performed on a block that has already been coded and then decoded resembles the partitioning of the block $CTB_i$ under consideration that is to be coded. As a result, the digital information sequence representative of the partitioning of the block $CTB_i$ that is to be coded also resembles the digital information sequence representative of the partitioning of the block that has already been coded and then decoded. It should be understood that the digital information sequence representative of the partitioning of the block $CTB_i$ that is to be coded contains a non-negligible amount of digital information that represents high signaling cost, thereby reducing the performance of the coding.

SUMMARY OF THE INVENTION

The present invention provides, in one aspect, a method of coding a current image that has previously been partitioned into blocks, the method performing the following steps for a current block that is to be coded:

partitioning the current block at least once into a plurality of subblocks; and representing the partitioning of current block in the form of a first digital information sequence.

Such a coding method is remarkable in that it comprises the steps consisting in:
predicting the partitioning of the current block relative to the partitioning of a block that has already been coded and then decoded and that is represented in the form of a second digital information sequence, by comparing the first and second sequences with each other or by comparing the corresponding partitionings with each other, and then by determining residual digital information representative of the comparison in application of a predetermined comparison criterion; and encoding the residual digital information as determined.

Such a provision thus makes it possible to encode only the difference between the partitioning of the current block and the reference partitioning, i.e. the partitioning of the block that has already been coded and then decoded, thereby significantly reducing the amount of digital information needed on decoding in order to reconstruct the partitioning of the current block.

In a particular implementation, the coding method includes a step consisting in transmitting a data signal to a decoder, which signal includes digital information indicating whether or not the partitioning prediction step has been performed.

Such a provision enables any present or future coders to have the option of activating or deactivating prediction of the partitioning of the current block, for an image sequence under consideration, for an image under consideration, or indeed for an image portion (or "slice") under consideration. As a result, such a partitioning prediction method is particularly flexible since it can be adapted to the current video context.

In another particular implementation, when the above-mentioned partitioning prediction step is performed, the data signal includes the encoded residual digital information as mentioned above.

Such a provision makes it possible for the purpose of reconstructing the current block, to inform the decoder about the result of the difference between the partitioning of the current block and the reference partitioning.

In yet another particular implementation, the current block and the already coded and then decoded block are respectively partitioned at least once to obtain two partitioning depth levels that are less than or equal to a predetermined partitioning depth level, and the predetermined comparison criterion is as follows:
comparing the partitioning of the current block and of the already coded and then decoded block at equal partitioning depth level;
iterating the comparison to the predetermined partitioning depth level; and
at the end of each comparison, determining residual digital information either of a first value or else of a second value depending on whether compared partitionings are respectively the same or different.

Such a provision makes it possible to reduce the cost of signaling when:
at least one of the partitionings of the current block or of the already coded and then decoded block was performed at a high partitioning depth level; and
the partitioning depth level of the current block is very different from the partitioning depth level of the already coded and then decoded block.

In yet another particular implementation, said comparison criterion is the following:

no residual digital information is determined if a subblock resulting from the partitioning of the current block and a corresponding subblock resulting from the partitioning of the already coded and then decoded block have not been partitioned again; and residual digital information is determined if a subblock resulting from the partitioning of the current block has been partitioned again and if a corresponding subblock resulting from the partitioning of the already coded and then decoded block has or has not been partitioned again.

In a variant, the comparison criterion is as follows:

no residual digital information is determined if a subblock resulting from the partitioning of the current block and a corresponding subblock resulting from the partitioning of the already coded and then decoded block have been partitioned again;

residual digital information is determined if a subblock resulting from the partitioning of the current block and a corresponding subblock resulting from the partitioning of the already coded and then decoded block have not been partitioned again; and residual digital information is determined if a subblock resulting from the partitioning of current block has been partitioned again and if a corresponding subblock resulting from the partitioning of the coded and then decoded block has not been partitioned again.

In yet another particular implementation, the coded and then decoded block has a pre-identified position:

in a decoded portion of the current image; or else
in another image that has already been decoded; or else
in an image component associated with another image component in which the current block is situated.

Such a provision thus makes it possible to implement the invention in the context of coding a two-dimensional image or image portion equally well by using an intra prediction mode or by using an inter prediction mode.

With inter coding, the other image that has already been decoded may be an image that occurs before or after the current image.

Such a provision thus makes it possible to perform the invention in the context of coding a two-dimensional image while using either a uni-predictive or a bi-predictive scheme.

Finally, such a provision makes it possible for the invention to be performed for three-dimensional (3D) video coding, such as multiview 3D coding, or HEVC 3D coding, where proposals have been made to code a first image component relative to at least one second image component that has already been coded and then decoded.

It should be observed that the first and second image components are not pieces of one image but, in the meaning of the invention, represent two different views of a complete image.

Such first and second image components may for example be respectively a texture component and the associated depth component, as used in the new multiview video plus depth (MVD) video coding format that is presently under development.

Alternatively, the above-mentioned first and second image components may be respectively a depth component and the associated texture component.

Other types of first and second image components may naturally be envisaged.

Thus, the first and second image components may be respectively:

two views of the same multiview image; or else
a luma component and a chroma component; or else
two different layers during scalable video coding.

It is also possible to envisage coding a first image component relative to a second image component and a third image component. Under such circumstances, and by way of example:

the first image component may be a component Y;
the second image component may be a component U; and
the third image component may be a component V.

The invention also provides a coder device for coding a current image that has previously been subdivided into blocks, the device being designed to perform the above-specified coding method. For a current block to be coded, such a device comprises:

partitioning means for partitioning the current block at least once into a plurality of subblocks; and
representation means for representing the partitioning of the current block in the form of a first digital information sequence.

Such a coder device is remarkable in that it comprises:

prediction means for predicting the partitioning of the current block relative to the partitioning of a block that has already been coded and then decoded and that is represented in the form of a second digital information sequence, the prediction means being suitable for comparing the first and second sequences with each other or for comparing the corresponding partitionings with each other, and then for determining residual digital information representative of the comparison in application of a predetermined comparison criterion; and
coder means for coding the determined residual digital information.

The invention also provides a data signal representative of an image coded using the above-specified coding method. Such a signal is remarkable in that it includes said encoded residual digital information, as mentioned above.

The invention also provides a method of decoding a data signal representative of a current image that has previously been partitioned into blocks and that has been coded, by performing for a current block for decoding a step that consists in initially reconstructing the partitioning of a decoded block.

Such a decoding method is remarkable in that it comprises the steps consisting in:

identifying, in said data signal, residual digital information representative of a comparison performed during coding between a first digital information sequence representing the partitioning of a current block and a second digital information sequence representing the above-specified partitioning of a decoded block, or indeed between the corresponding partitionings, in application of a predetermined comparison criterion; and
reconstructing the partitioning of the current block from the reconstructed partitioning of the decoded block and from the identified residual digital information.

On receiving and reading coding information, and more particularly residual digital information representative of the difference between the partitioning of the current block and the reference partitioning, such a decoding technique makes it possible to reconstruct the current block by applying a prediction that is the inverse of the prediction performed in the above-specified coding method.

The invention also provides decoder device for performing the above-specified decoding method, said decoder device being adapted to decoding a data signal representative of a current image that has previously been partitioned into blocks and that has been coded, the device comprising, for a current block for decoding, reconstruction means suitable for initially reconstructing the partitioning of a decoded block.

Such a decoder device is remarkable in that it comprises:
identification means for identifying, in the data signal, residual digital information representative of a comparison performed on coding between a first digital information sequence representing the partitioning of a current block and a second digital information sequence representing the partitioning of a decoded block, or else between the corresponding partitionings, in application of a predetermined comparison criterion; and the above-mentioned reconstruction means being suitable for reconstructing the partitioning of the current block from the reconstructed partitioning of the decoded block and from the identified residual digital information.

The invention also provides a computer program including instructions for performing the coding method or the decoding method of the invention when the program is executed on a computer.

The program may use any programming language and be in the form of source code, object code, or code intermediate between source code and object code, such as in a partially compiled form, or in any other desirable form.

The invention also provides a computer readable data medium storing a computer program, the program including instructions adapted to performing the coding or the decoding method of the invention, as described above.

The data medium may be any entity or device capable of storing the program. For example, the medium may comprise storage means such as a read only memory (ROM), e.g. a compact disk (CD) ROM, or a microelectronic circuit ROM, or indeed magnetic recording means, e.g. a universal serial bus (USB) stick or a hard disk.

Furthermore, the data medium may be a transmissible medium such as an electrical or optical signal that may be conveyed by an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the above-specified coding or decoding method.

The above-mentioned coder device and the corresponding computer program present at least the same advantages as those imparted by the coding method of the present invention.

The above-mentioned decoder device, and corresponding computer program and data medium present at least the same advantages as those imparted by the decoding method of the present invention.

BRIEF DESCRIPTION OF THE DRAWINGS

Other characteristics and advantages appear on reading the description of preferred implementations made with reference to the figures, in which.

DETAILED DESCRIPTION OF ILLUSTRATIVE EMBODIMENTS

1. A Coding Method

There follows a description of an implementation of the invention in which the coding method of the invention is used for coding an image or a sequence of images as a binary stream similar to that obtained by coding that complies for example with the HEVC 2D standard that is in preparation.

In this implementation, the coding method of the invention is implemented by way of example in software or hardware form by making modifications to a coder initially in compliance with the HEVC 2D standard. The coding method of the invention is shown in the form of an algorithm comprising steps C1 to C7, as shown in FIG. 2.

Figure 3:
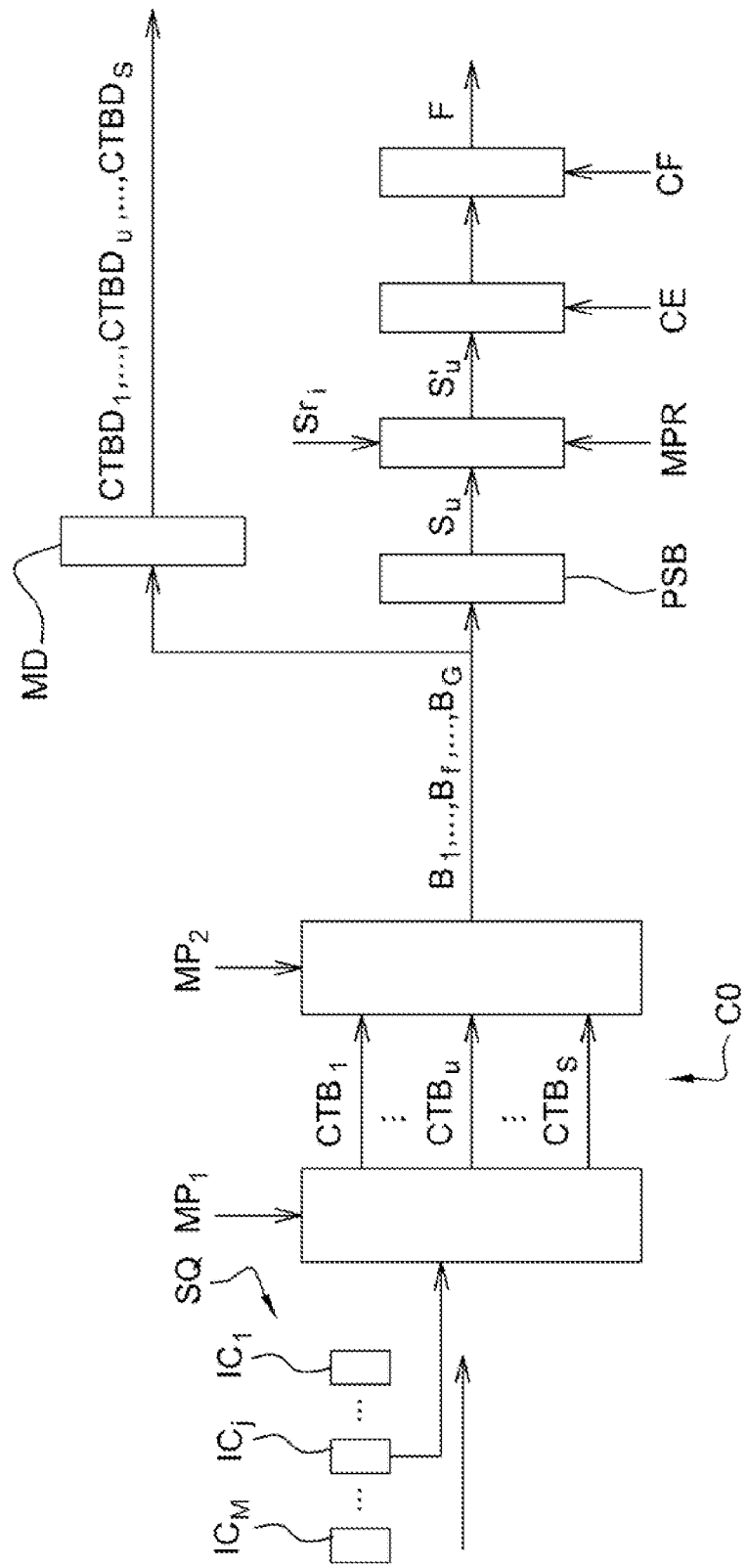
FIG. 3 shows an embodiment of a coder device of the invention.

In the embodiment of the invention, the coding method of the invention is implemented in a coder device CO as shown in FIG. 3.

Figure 1A:
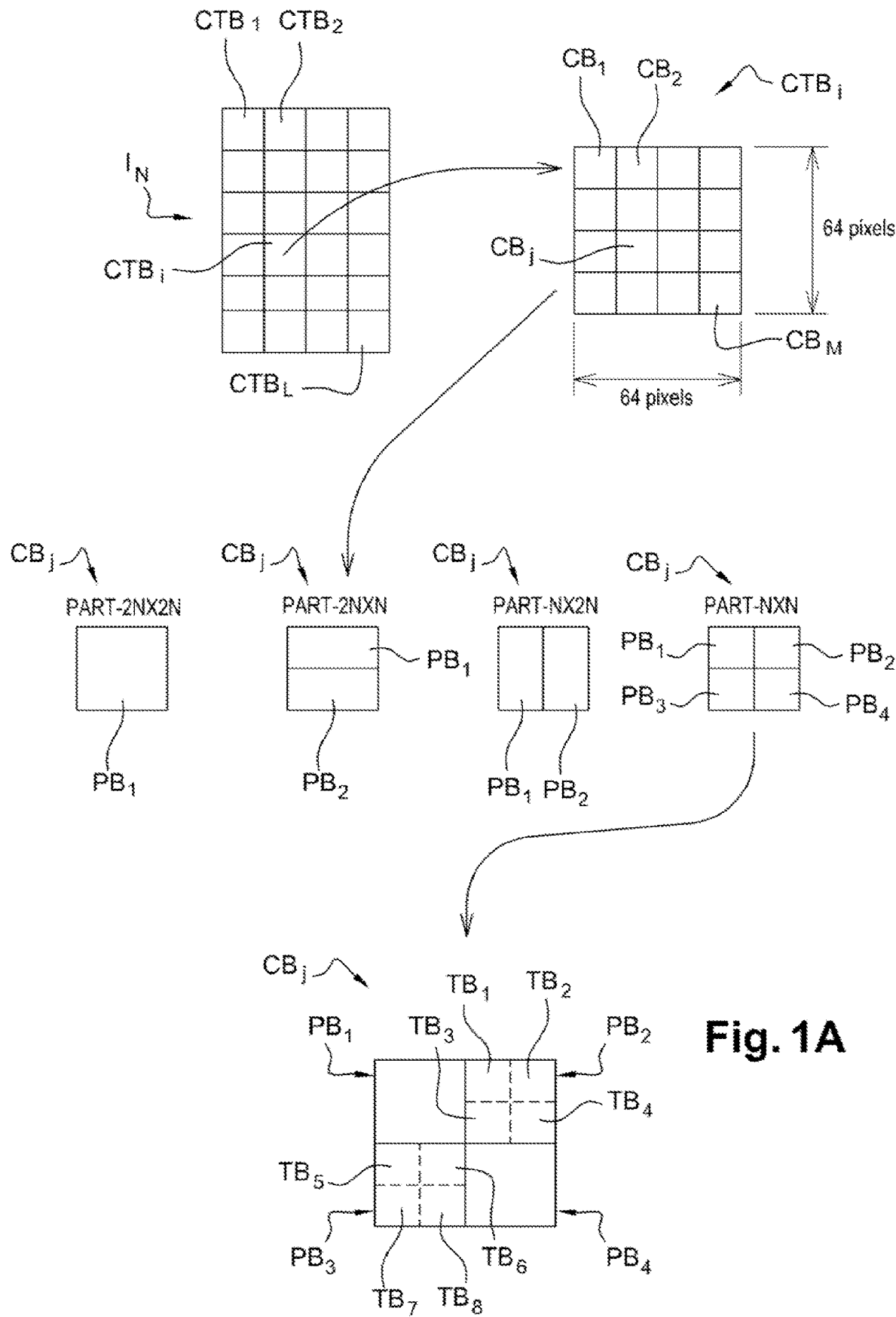
FIG. 1A shows the successive operations for partitioning a block in compliance with HEVC technology.
Figure 1B:
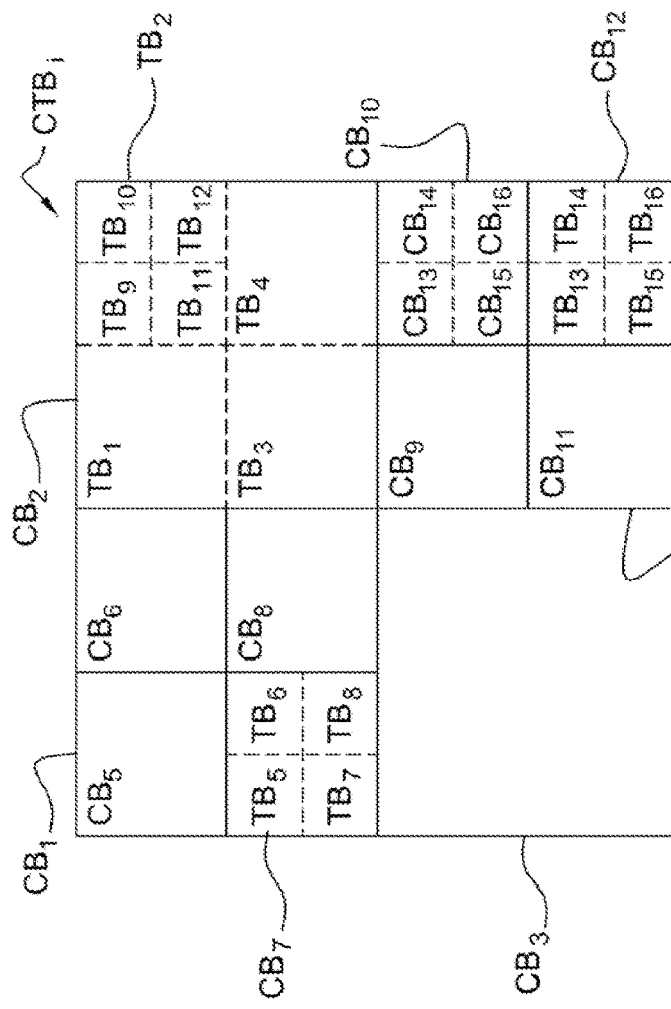
FIG. 1B shows an example of partitioning a coding block as obtained after prediction and transformation of the block, together with the corresponding prediction and transformation tree structure.
Figure 1B:
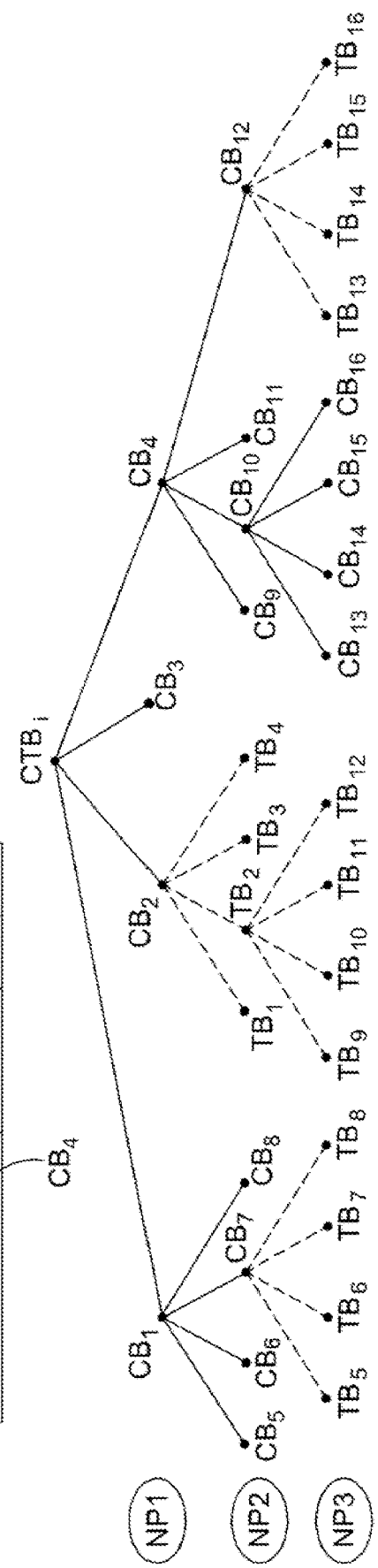
Figure 2:
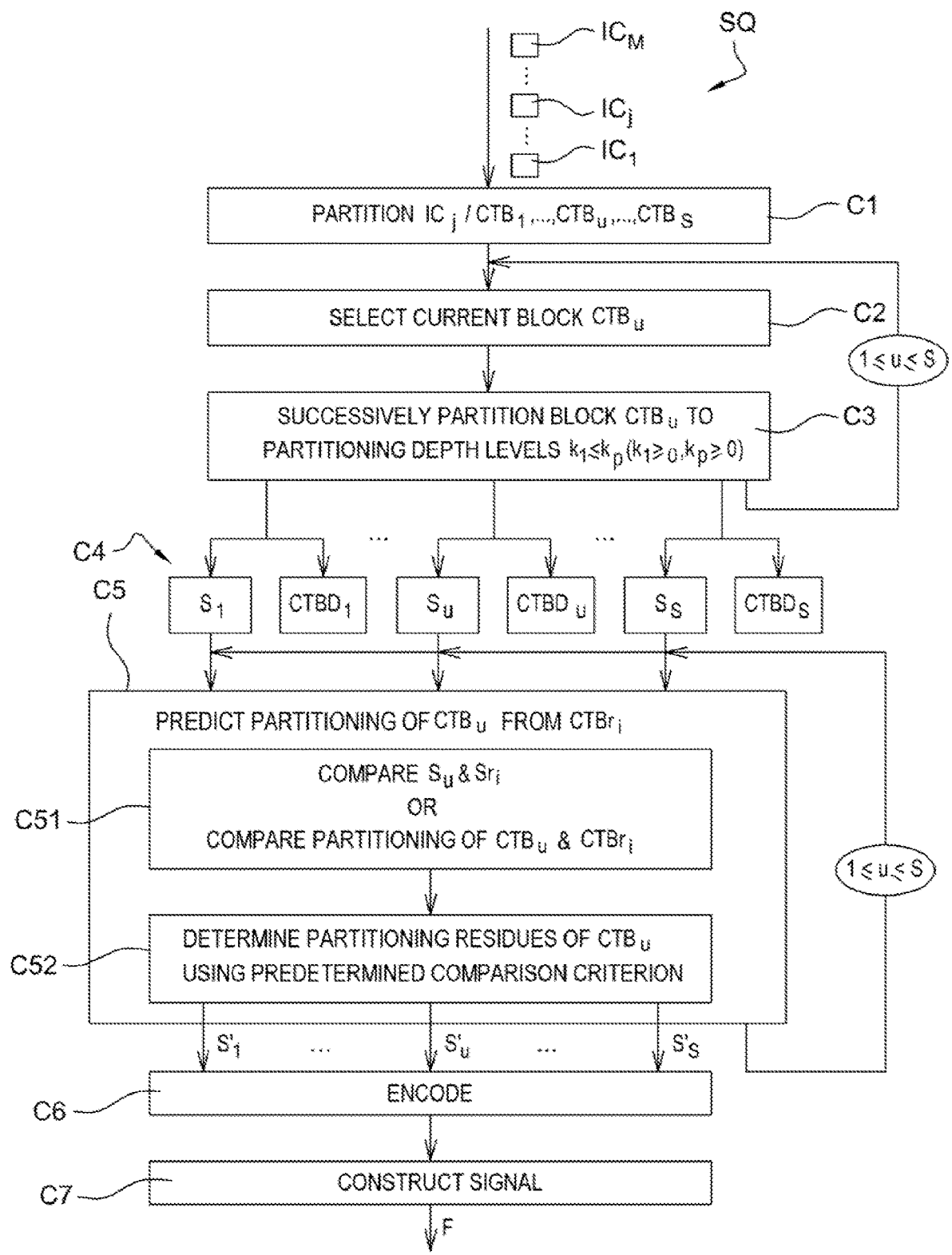
FIG. 2 shows steps of the coding method of the invention.

During a prior step C1 shown in FIG. 2, a current image $IC_j$ forming part of a sequence SQ of images $IC_1, \ldots, IC_j, \ldots, IC_M$ is partitioned in conventional manner into a plurality of blocks $CTB_1, CTB_2, \ldots, CTB_u, \ldots, CTB_S$ ($1 \leq u \leq S$), e.g. presenting a size of 64×64 pixels. Such a partitioning step is performed by a first partitioning software module MP1 shown in FIG. 3.

It should be observed that in the meaning of the invention, the term "block" has the same meaning as the "coding unit" in the terminology used in particular in the HEVC standard, e.g. in the document by: B. Bross, W. J Han, J. R. Ohm, G. J. Sullivan, and T. Wiegand, entitled "High efficiency video coding (HEVC) text specification draft 6", Document JCTVC-H1003 of JCT-VC, San Jose, Calif., USA, February 2012.

In particular, such a coding unit groups together sets of pixels that are rectangular or square in shape and that are also known as blocks, or macroblocks, or indeed sets of pixels presenting other geometrical shapes.

During a step C2 shown in FIG. 2, a block $CTB_u$ of the current image $IC_j$ is selected as a current block for coding.

During a step C3 shown in FIG. 2, the selected block $CTB_u$ is partitioned into a plurality of coding subblocks $B_1, B_2, \ldots, B_f, \ldots, B_G$ with $1 \leq f \leq G$. Such partitioning complies with a "quadtree" type structure, as described above. Other types of tree structure could naturally be envisaged.

In accordance with the invention, the block $CTB_u$ is partitioned at least once until reaching a partitioning depth level $k_1$ that is less than or equal to a predetermined partitioning depth level $k_P$ ($k_1 \geq 0$, $k_P \geq 0$).

Said partitioning is performed by a second partitioning software module MP2 shown in FIG. 3.

The steps C2 to C3 are reiterated for all of the blocks $CTB_1, CTB_2, \ldots, CTB_S$.

Figure 4A:
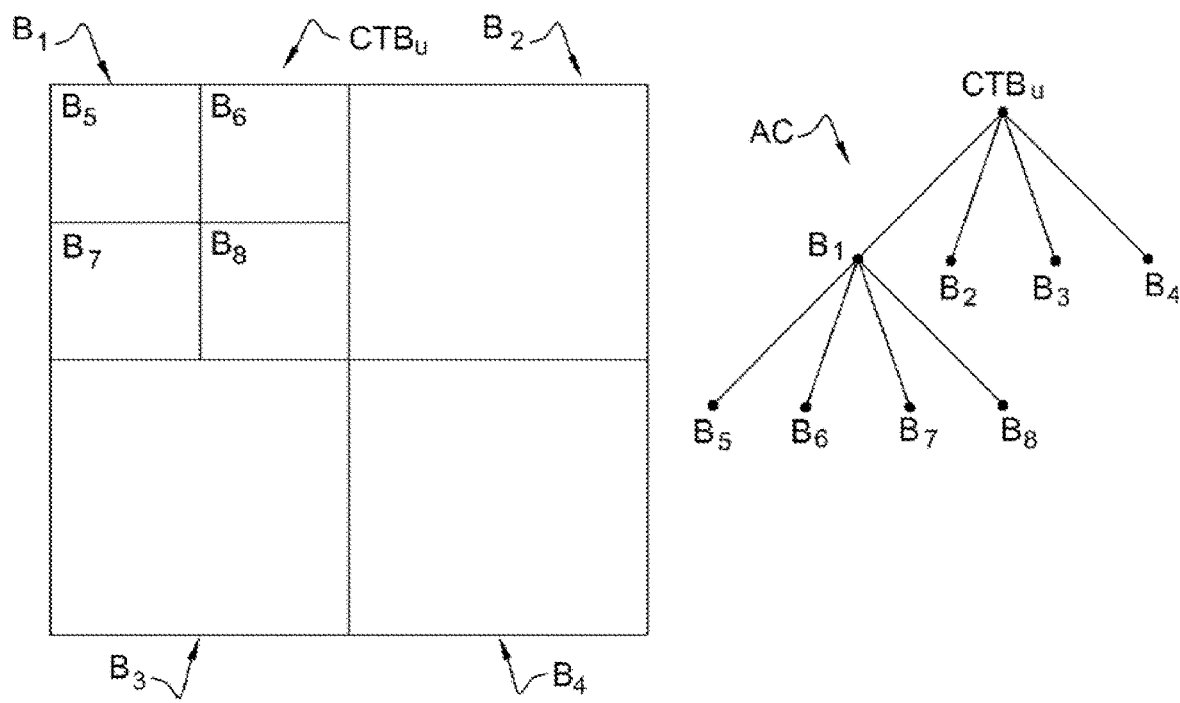
FIG. 4A shows an example of partitioning a current block that is to be coded, together with the tree structure representative of the partitioning performed.

An example of partitioning the block $CTB_u$ is shown in FIG. 4A.

In the example shown, the current block $CTB_u$ is partitioned to a depth level $k_1=2$ that is set by the coder, said level being less than a predetermined partitioning depth level $k_P$, such as for example $k_P=4$. In the example shown, the partitioning depth level $k_1$ is determined as being the level for which the final partitioning obtained for the selected block $CTB_u$ optimizes a coding performance criterion, in particular the data rate/distortion cost, for example.

With reference to FIG. 4A, for the given current block $CTB_u$, it is considered that this block constitutes the root of a coding tree AC in which:
  a first level of leaves under the root corresponds to a first partitioning depth level of the block $CTB_u$ for which the block $CTB_u$ has been partitioned a first time into a plurality of coding subblocks, e.g. four coding subblocks $B_1, B_2, B_3, B_4$; and
  a second level of leaves under the first level of leaves corresponds to a second partitioning depth level of the block $CTB_u$ for which the block $CTB_u$ that has been partitioned a first time is partitioned a second time into a plurality of coding subblocks, e.g. four coding subblocks $B_5, B_6, B_7, B_8$ resulting from partitioning the block $B_1$.

During a step C4 shown in FIG. 2, a sequence S of bits $S_1, S_2, \ldots, S_u, \ldots, S_S$ is produced, which bits are representative respectively of the partitionings performed on the blocks $CTB_1, CTB_2, \ldots, CTB_u, \ldots, CTB_S$. A decoded version of the blocks $CTB_1, CTB_2, \ldots, CTB_u, \ldots, CTB_S$ is also produced, which decoded blocks are written $CTBD_1, CTBD_2, \ldots, CTBD_u, \ldots, CTBD_S$ in FIGS. 2 and 3. Such decoded blocks are for reuse by the coder CO in order to code a following image of the sequence SQ.

Such a step of producing binary sequences is performed by a data processor software module PSB shown in FIG. 3.

The above-mentioned decoding step is performed by the decoding module MD, also shown in FIG. 3.

In accordance with the invention, during a step C5 shown in FIG. 2, the partitioning of the current block $CTB_u$ is predicted relative to the partitioning of a block that has already coded and then decoded, which block is selected from a plurality of candidate blocks that have already been coded and then decoded: $CTBr_1, CTBr_2, \ldots, CTBr_i, \ldots, CTBr_L$ with $1 \leq i \leq L$.

Such a prediction step C5 is performed in a prediction software module MPR shown in FIG. 3.

By way of example, the selected block that has already been coded and then decoded is the block $CTBr_i$.

The selected block $CTBr_i$ was previously partitioned into a plurality of coding subblocks $Br_1, Br_2, \ldots, Br_f, \ldots, Br_G$ with Such partitioning complies with a quadtree type structure, as described above.

Other types of tree structure could naturally be envisaged.

In accordance with the invention, the partitioning of the block $CTBr_i$ is performed at least once until a partitioning depth level $k_2$ is obtained that is less than or equal to a predetermined partitioning depth level $k_P$ ($k_2 \geq 0$, $k_P \geq 0$).

Said partitioning is performed by the second partitioning software module MP2 shown in FIG. 3.

Figure 4B:
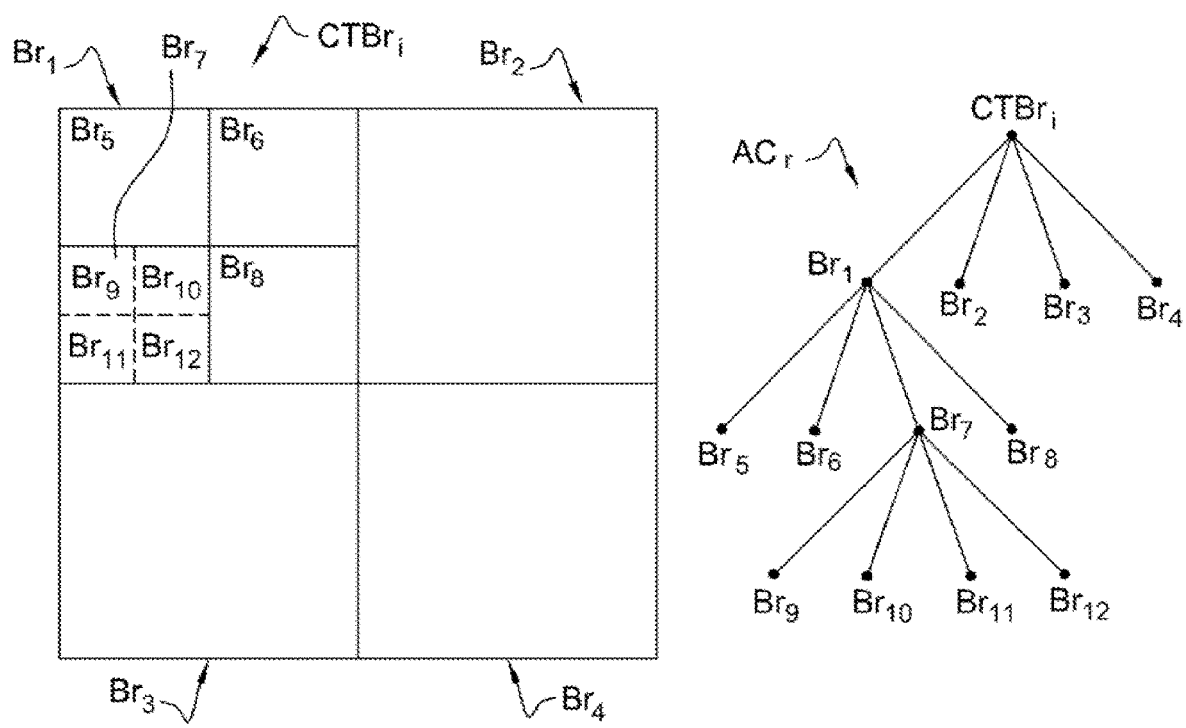
FIG. 4B shows an example of partitioning a block that has already been coded and then decoded, together with the tree structure representative of the partitioning performed.

An example of the partitioning of the block $CTBr_i$ is shown in FIG. 4B.

In the example shown, the partitioning of the current block $CTBr_i$ is performed to a depth level $k_2=3$ set by the coder and less than the predetermined partitioning depth level $k_P$, such as $k_P=4$. The partitioning depth level $k_2$ is determined as being the level for which the final partitioning obtained for the selected block $CTBr_i$ optimizes a coding performance criterion, in particular the data rate/distortion cost, for example.

With reference to FIG. 4B, for a given block $CTBr_i$, it is considered that this block constitutes the root of a coding tree ACr in which:
  a first level of leaves under the root corresponds to a first partitioning depth level of the block $CTBr_i$ for which the block $CTBr_i$ has been partitioned a first time into a plurality of coding subblocks, e.g. four coding subblocks $Br_1, Br_2, Br_3, Br_4$;
  a second level of leaves under the first level of leaves corresponds to a second partitioning depth level of the block $CTBr_i$ for which the block $CTBr_i$ that has been partitioned a first time is partitioned a second time into a plurality of coding subblocks, e.g. four coding subblocks $Br_5, Br_6, Br_7, Br_8$ obtained by partitioning the subblock $Br_4$; and
  a third level of leaves under the second level of leaves corresponds to a third partitioning depth level of the block $CTBr_i$ for which the block $CTBr_i$ that has been partitioned a second time is partitioned a third time into a plurality of coding subblocks, e.g. four coding subblocks $Br_9, Br_{10}, Br_{11}, Br_{12}$ obtained by partitioning the subblock $Br_7$.

The partitioning of the block $CTBr_i$ that has been coded and then decoded is represented in the form of a sequence of bits $Sr_i$.

The table below shows an example of content for a sequence $Sr_i$ representative of the partitioning of the coded and then decoded block $CTBr_i$ and content for the sequence $S_u$ representative of the partitioning of the current block $CTB_u$.

| $Sr_i$ | 1 | 1 | 0 | 0 | 1 | 0 | 0 | 0 | 0 | 0 | 0 | 0 | 0 |
|---|---|---|---|---|---|---|---|---|---|---|---|---|---|
| $S_u$ | 1 | 1 | 0 | 0 | 0 | 0 |   |   |   | 0 | 0 | 0 |   |

For the sequence $Sr_i$:
  the first bit "1" indicates that the block $CTBr_i$ is partitioned into four smaller subblocks $Br_1, Br_2, Br_3, Br_4$;
  the second bit "1" indicates that the subblock $Br_1$ is partitioned into four smaller subblocks $Br_5, Br_6, Br_7, Br_8$;
  the third bit "0" indicates that the subblock $Br_5$ is not partitioned;
  the fourth bit "0" indicates that the subblock $Br_6$ is not partitioned;
  the fifth bit "1" indicates that the subblock $Br_7$ is partitioned into four smaller subblocks $Br_9, Br_{10}, Br_{11}, Br_{12}$;
  the sixth bit "0" indicates that the subblock $Br_9$ is not partitioned;
  the seventh bit "0" indicates that the subblock $Br_{10}$ is not partitioned;
  the eighth bit "0" indicates that the subblock $Br_{22}$ is not partitioned;
  the ninth bit "0" indicates that the subblock $Br_{12}$ is not partitioned;
  the tenth bit "0" indicates that the subblock $Br_8$ is not partitioned;

the eleventh bit "0" indicates that the subblock $Br_2$ is not partitioned;

the twelfth bit "0" indicates that the subblock $Br_3$ is not partitioned; and the thirteenth bit "0" indicates that the subblock $Br_4$ is not partitioned.

For the sequence $S_u$:

the first bit "1" indicates that the block $CTB_u$ is partitioned into four subblocks $B_1$, $B_2$, $B_3$, $B_4$;

the second bit "1" indicates that the block $B_1$ is partitioned into four subblocks $B_5$, $B_6$, $B_7$, $B_8$;

the third bit "0" indicates that the subblock $B_5$ is not partitioned;

the fourth bit "0" indicates that the subblock $B_6$ is not partitioned;

the fifth bit "0" indicates that the subblock $B_7$ is not partitioned;

the sixth bit "0" indicates that the subblock $B_8$ is not partitioned;

the seventh bit "0" indicates that the subblock $B_2$ is not partitioned;

the eighth bit "0" indicates that the subblock $B_3$ is not partitioned; and the ninth bit "0" indicates that the subblock $B_4$ is not partitioned.

The last three bits of the sequence $S_u$ are offset to the end of the sequence in order to indicate that there is a difference of partitioning between the subblock $B_7$ and the subblock $Br_7$ of block $CTBr_i$.

Said prediction step C5 shown in FIG. 2 comprises:

a substep C51 of comparing the sequences $Sr_i$ and $S_u$ with each other or indeed of comparing the corresponding partitionings with each other; and a substep C52 of determining residual bits representative of said comparison, in application of a predetermined comparison criterion.

At the end of the prediction step C5, a sequence $S'_u$ is obtained that is representative of the predicted partitioning of each current block $CTB_u$.

The prediction step C5 is reiterated for all of the sequences $S_1$ to $S_S$ so as to obtain sequences $S'_2$ to $S'_S$ that are representative of the predicted partitioning of the current blocks $CTB_i$ to $CTB_S$.

Whether an HEVC compatible coder has or has not performed said prediction step is signaled by digital information such as a "1" bit to indicate that the prediction of the partitioning has been performed, or else a "0" bit to indicate that the prediction of the partitioning has not been performed. Depending on circumstances, one such bit may be signaled per image sequence, or per image, or indeed per image portion or "slice".

In accordance with a first comparison criterion, the following steps are performed:

comparing the partitioning of the current block $CTB_u$ and of the already coded and then decoded block $CTBr_i$ at equal partitioning depth level $k_1$, $k_2$;

iterating said comparison to said predetermined partitioning depth level $k_P$; and at the end of each comparison, determining residual digital information having either a first value, or else a second value depending on whether the compared partitionings are respectively the same or different.

To this end, said comparison is performed in compliance with the table T1 below down to the partitioning depth level $k_P$, which is equal to 4 in the presently-described example:

| $CTBr_i$ | $CTB_u$ | $S'_u$ |
|---|---|---|
| 1 | 1 | 0 |
| 0 | 0 | 0 |
| 1 | 0 | 1 |
| 0 | 1 | 1 |

In this example, the residual information with the first value is a "0" bit and the residual information with a second value is "1" bit.

The table T1 comprises:

a first row indicating that if at equal partitioning depth level a subblock of the current block $CTB_u$ and a corresponding subblock of the coded and then decoded block $CTBr_i$ have been partitioned identically ("1" bit), then the residual information value from the comparison is a "0" bit;

a second row indicating that if at equal partitioning depth level neither a subblock of the current block $CTB_u$, nor a corresponding subblock of the coded and then decoded block $CTBr_i$ has been partitioned ("0" bit), then the value of the residual information from the comparison is a "0" bit;

a third row indicating that if at equal partitioning depth level a subblock of the coded and then decoded block $CTBr_i$ has been partitioned ("1" bit), and a corresponding subblock of the current block $CTB_u$ has not been partitioned ("0" bit), then the value of the residual information from the comparison is a "1" bit; and a fourth row indicating that if at equal partitioning depth level a subblock of the coded and then decoded block $CTBr_i$ has not been partitioned ("0" bit), while a corresponding subblock of the current block $CTB_u$ has been partitioned ("1" bit), then the value of the residual information from the comparison is a "1" bit.

The partitionings at equal partitioning depth level are compared in a predetermined order for ordering the subblocks of the current block $CTB_u$ and of the coded and then decoded block $CTBr_i$ such as for example the "raster scan" order that is well known to the person skilled in the art.

At the end of the comparison in accordance with table T1, the sequence of residual bits representative of the predicted partitioning for the current block $CTB_u$ is as follows:

| $S'_u$ | 0 | 0 | 0 | 0 | 0 | 0 | 0 | 1 | 0 | 0 | 0 | 0 | 0 |
|---|---|---|---|---|---|---|---|---|---|---|---|---|---|

The last "0" bit in the sequence $S'_u$ indicates that neither of the blocks $CTB_u$ and $CTBr_i$ reach the partitioning depth level $k_P$=4.

As an alternative, another convention for bit values may be used in table T1, such as that given below:

| $CTBr_i$ | $CTB_u$ | $S'_u$ |
|---|---|---|
| 1 | 1 | 1 |
| 0 | 0 | 1 |
| 1 | 0 | 0 |
| 0 | 1 | 0 |

In application of a second comparison criterion, which is similar to the above-described first comparison criterion, said comparison is performed in compliance with table T2 below down to a partitioning depth level $k_P$, which is equal to 4 in the presently-described example:

| $CTBr_i$ | $CTB_u$ | $S'_u$ |
|---|---|---|
| 1 | 1 | 0 |
| 0 | 0 | 0 |
| 1 | 0 | 1 plus a bit giving the location of the different partitioning of the subblock of the block $CTBr_i$ |
| 0 | 1 | 1 plus a bit giving the location of the different partitioning of the subblock of the block $CTB_u$ |

In this example, the residual information having a first value is a "0" bit, and the residual information having a second value is a "1" bit followed by a bit giving the location of the different partitioning of the subblock of the current block $CTB_u$ or of the coded and then decoded block $CTBr_i$.

Table T2 comprises:
- a first row indicating that if at equal partitioning depth level a subblock of the current block $CTB_u$ and a corresponding subblock of the coded and then decoded block $CTBr_i$ have been partitioned identically ("1" bit), then the value of the residual information resulting from the comparison is a "0" bit;
- a second row indicating that if at equal partitioning depth level neither a subblock of the current block $CTB_u$, nor a corresponding subblock of the coded and then decoded block $CTBr_i$ has been partitioned ("0" bit), then the value of the residual information resulting from the comparison is a "0" bit;
- a third row indicating that if at equal partitioning depth level a subblock of the coded and then decoded block $CTBr_i$ has been partitioned identically ("1" bit), while a corresponding subblock of the current block $CTB_u$ has not been partitioned ("0" bit), then the value of the residual information resulting from the comparison is a "1" bit followed by another bit indicating the location of the different partitioning of the subblock of the coded and then decoded block $CTBr_i$; and
- a fourth row indicating that if at equal partitioning depth level a subblock of the coded and then decoded block $CTBr_i$ has not been partitioned ("0" bit), while a corresponding subblock of the current block $CTB_u$ has been partitioned ("1" bit), then the value of the residual information resulting from the comparison is a "1" bit followed by another bit indicating the location of the different partitioning of the block $CTB_u$.

At the end of the comparison in compliance with table T2, the sequence of residual bits representative of the predicted partitioning of the current block $CTB_u$ is as follows:

| $S'_u$ | 0 | 0 | 1 | 0 | 0 | 0 | 1 | 0 |
|---|---|---|---|---|---|---|---|---|

In this sequence $S'_u$, and with reference to FIGS. 4A and 4B:
- the first bit "0" indicates the same partitioning of the block $CTBr_i$ and $CTB_u$ into four subblocks, considered at the first partitioning depth level;
- the second bit "0" indicates the same partitioning of the top-left first subblock of the block $CTBr_i$ and $CTB_u$, considered at the second partitioning depth level;
- the third bit "1" indicates there was partitioning of a subblock of the first subblock situated top-left of the coded and then decoded block $CTBr_i$ that does not appear in the corresponding subblock of the current block $CTB_u$, considered at the third partitioning depth level;
- the fourth bit "0" indicates that neither of the blocks $CTB_u$ and $CTBr_i$ reach the partitioning depth level $k_P=4$;
- the fifth bit "0" indicates no partitioning of the subblock $Br_5$;
- the sixth bit "0" indicates no partitioning of the subblock $Br_6$;
- the seventh bit "1" indicates partitioning of the subblock $Br_7$ into four subblocks; and
- the eighth bit "0" indicates no partitioning of the subblock $Br_8$.

As an alternative, another convention for bit values may be used in table T2, as given below:

| $CTBr_i$ | $CTB_u$ | $S'_u$ |
|---|---|---|
| 1 | 1 | 1 |
| 0 | 0 | 1 |
| 1 | 0 | 0 plus a bit giving the location of the different partitioning of the subblock of the block $CTBr_i$ |
| 0 | 1 | 0 plus a bit giving the location of the different partitioning of the subblock of the block $CTB_u$ |

In application of a third comparison criterion, said comparison is performed in compliance with table T3 below:

| $CTBr_i$ | $CTB_u$ | $S'_u$ |
|---|---|---|
| 1 | 1 | 1 |
| 0 | 0 | — |
| 1 | 0 | 0 |

Table T3 comprises:
- a first row indicating that if a subblock of the current block $CTB_u$ and a corresponding subblock of the coded and then decoded block $CTBr_i$ have been partitioned identically ("1" bit), then the value of the residual information resulting from this comparison is a "1" bit;
- a second row indicating that if neither a subblock of the current block $CTB_u$ nor a corresponding subblock of the coded and then decoded block $CTBr_i$ has been partitioned ("0" bit), then no residual information is determined as a result of the comparison; and
- a third row indicating that if a subblock of the coded and then decoded block $CTBr_i$ has been partitioned ("1" bit), while a corresponding subblock of the current block $CTB_u$ has not been partitioned ("0" bit), then the value of the residual information resulting from the comparison is a "0" bit.

The above-mentioned sequences $Sr_i$ and $S_u$ are then compared with each other, the first bit of the sequence $Sr_i$ being compared with the first bit of the sequence $S_u$, and so on to the last bit of each of the sequences.

At the end of the comparison performed in accordance with table T3, the sequence of residual bits representative of the predicted partitioning of the current block $CTB_u$ is as follows:

| $S'_u$ | 1 | 1 |  |  | 0 |  |  |  |  |  |  |
|---|---|---|---|---|---|---|---|---|---|---|---|

In application of a fourth comparison criterion, said comparison is performed in compliance with table T4 below:

| CTBr$_i$ | CTB$_u$ | S'$_u$ |
|---|---|---|
| 1 | 1 | — |
| 0 | 0 | 0 |
| 1 | 0 | 1 plus a bit indicating the type of the different partitioning of the subblock of the block CTBr$_i$ |

Table T4 comprises:
- a first row indicating that if a subblock of the current block CTB$_u$ and a corresponding subblock of the coded and then decoded block CTBr$_i$ have been partitioned identically ("1" bit), then no residual information is determined as a result of the comparison;
- a second row indicating that if neither a subblock of the current block CTB$_u$ nor a corresponding subblock of the coded and then decoded block CTBr$_i$ has been partitioned ("0" bit), then the value of the residual information resulting from the comparison is a "0" bit; and
- a third row indicating that if a subblock of the coded and then decoded block CTBr$_i$ has been partitioned ("1" bit), while a corresponding subblock of the current block CTB$_u$ has not been partitioned ("0" bit), then the value of the residual information resulting from the comparison is a "1" bit followed directly by other bits indicating the type of the different partitioning of the subblock of the block CTBr$_i$.

The above-mentioned sequences Sr$_i$ and S$_u$ are then compared with each other, the first bit of the sequence Sr$_i$ being compared with the first bit of the sequence S$_u$, and so on to the last bit of each of the sequences.

At the end of the comparison in accordance with table T4, the sequence of residual bits representative of the predicted partitioning of the current block CTB$_u$ is as follows:

| S'$_u$ | | | 0 | 0 | 1 | 0 | 0 | 0 | 0 | 0 | 0 | 0 | 0 |

In this sequence S'$_u$ and with reference to FIG. 4B, the four "0" bits following the "1" bit indicate the partitioning of the subblock Br$_7$ into four subblocks Br$_9$, Br$_{10}$, Br$_{11}$, Br$_{12}$.

In application of a fifth comparison criterion, which is a combination of the above-described second and third comparison criteria, said comparison is performed in compliance with table T5 below, starting from the second partitioning depth level and continuing to the partitioning depth level k$_P$ which is equal to 4 in the presently-described example:

| CTBr$_i$ | CTB$_u$ | Depth level bit | S'$_u$ |
|---|---|---|---|
| 1 | 1 | 1 | 1 |
| 0 | 0 | — | — |
| 1 | 0 | 1 | 0 |
| 1 | 1 | 0 | — |
| 1 | 0 | 0 | — |

Table T5 uses the same conventions as table T3. It differs therefrom by having an additional column labeled "depth level bit" indicating that when at equal partitioning depth level a subblock of the current block CTB$_u$ and a corresponding subblock of the coded and then decoded block CTBr$_i$ have been partitioned differently, then the depth level bit is set to "1" to indicate explicitly a partitioning difference between a subblock of the current block CTB$_u$ and a subblock of the coded and then decoded block CTBr$_i$.

At the end of the comparison in accordance with table T5, the sequence of residual bits representative of the predicted partitioning of the current block CTB$_u$ is as follows:

| Depth level bits | 0 | 1 | 0 | | | | | | | | |
|---|---|---|---|---|---|---|---|---|---|---|---|
| S'$_u$ | 1 | | | | 0 | | | | 0 | | |

In this sequence, and with reference to FIGS. 4A and 4B:
- the first depth level bit is "0" since at the second partitioning depth level the partitioning of the subblock B$_1$ of the block CTB$_u$ is the same as the partitioning of the subblock Br$_1$ of the block CTBr$_i$;
- the second depth level bit is "1", since at the third partitioning depth level, the subblock B$_7$ of the block CTB$_u$ is not partitioned, whereas the subblock Br$_7$ of the block CTBr$_i$ is partitioned into four subblocks Br$_9$ to Br$_{12}$; and
- the third depth level bit is "0", given that none of the blocks CTB$_u$ and CTBr$_i$ reach the fourth partitioning depth level k$_P$.

With reference to FIG. 2, at the end of the prediction step C5, the sequence S'$_u$ representative of the predicted partitioning for the current block CTB$_u$ is encoded during a step C6.

Such an encoding step is performed by an entropic coder CE shown in FIG. 3.

Figure 5:
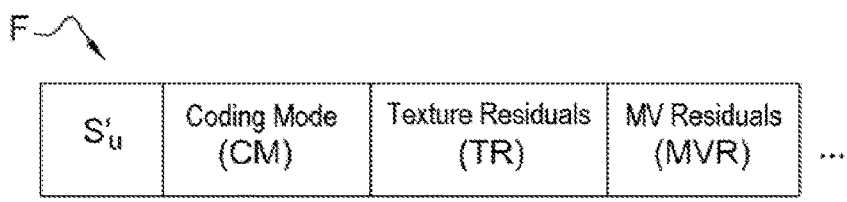
FIG. 5 shows a data signal obtained by the coding method of the invention.

Thereafter, during a step C7 shown in FIG. 2, a data signal F is constructed as shown in FIG. 5 that contains the sequence S'$_u$ together with other conventional residual data such as for example the coding mode CM of the block CTB$_u$, its texture residuals written TR, and its movement vector (MV) residuals written MVR.

The data signal F is constructed in a stream-constructing software module CF as shown in FIG. 3.

The data signal F is then transmitted over a communications network (not shown) to a remote terminal. The remote terminal has a decoder that is described in greater detail below.

Figure 6A:
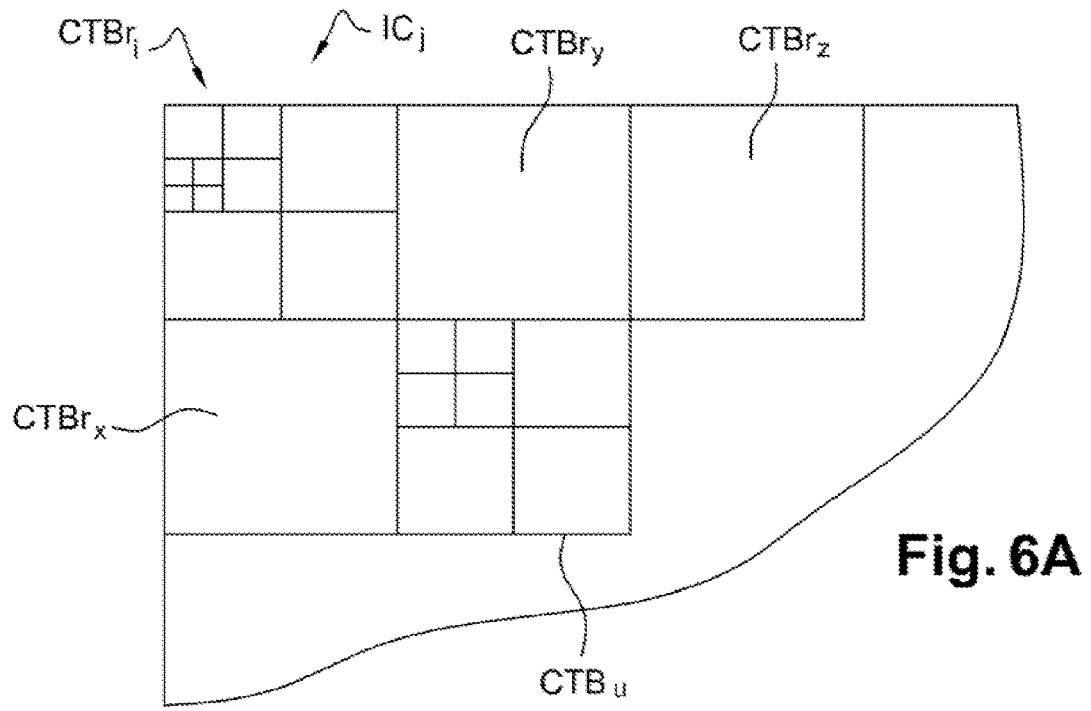
FIGS. 6A to 6C show respectively a plurality of potential pre-identified positions in which the coded and then decoded block might be found.
Figure 6B:
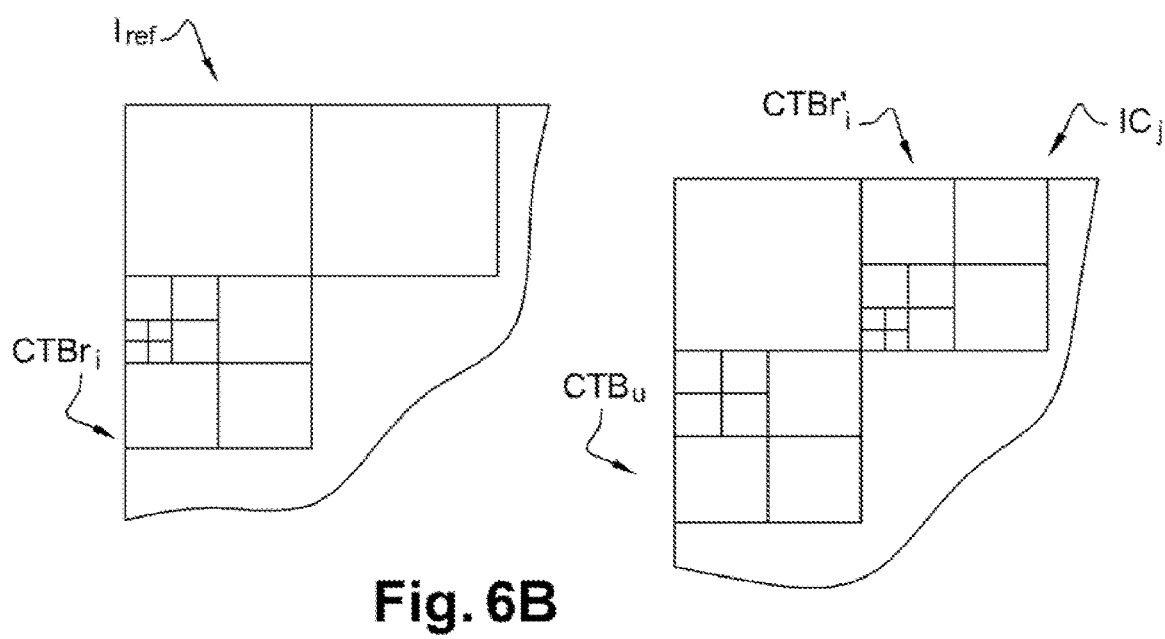
Figure 6C:
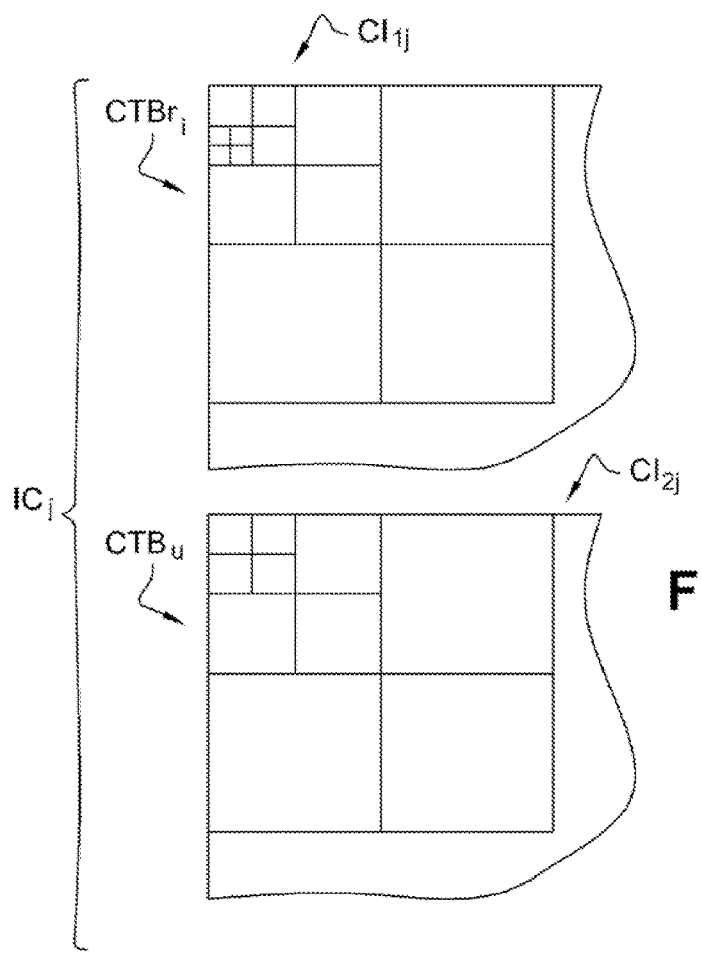

With reference to FIGS. 6A to 6C, various pre-identified positions of the coded and then decoded block CTBr$_i$ are described.

With reference to FIG. 6A, the current image IC$_j$ is constituted for example by a two-dimensional image. In this example, the coded and then decoded block CTBr$_i$ is selected in a portion of the current image IC$_j$ that has already been coded and then decoded. By way of example, such a selection is made from among four blocks neighboring the current block CTB$_u$, which blocks are the following:
- the block CTBr$_x$ situated to the left of the current block CTB$_u$;
- the block CTBr$_i$ itself, situated above and to the left of the current block CTB$_u$;
- the block CTBr$_y$ situated above the current block CTB$_u$; and
- the block CTBr$_x$ situated above and to the right of the current block CTB$_u$.

The index for the selected block CTBr$_i$ is transmitted in the data signal F.

With reference to FIG. 6B, the image IC$_j$ is still a two-dimensional image. In this example, the coded and then decoded block $CTBr_i$ is selected in an image $I_{ref}$ that has already been coded and then decoded and that by way of example immediately precedes the current image $IC_j$. The coded and then decoded block $CTBr_i$ is situated in the image $I_{ref}$, e.g. at the same position as the current block $CTB_u$ in the current image $IC_j$. The index of the coded and then decoded block $CTBr_i$ is transmitted in the data signal F.

In a possible alternative to the example shown in FIG. 6B, a coded and then decoded block may in the same manner as in the example of FIG. 6A, be selected in a portion of the current image $IC_j$ that has already been coded and then decoded, instead of being selected in the above-mentioned image $I_{ref}$. In the example of this variant shown in FIG. 6B, the coded and then decoded block that is selected is written $CTB'r_i$ in FIG. 6B and it is the block situated above and to the right of the current block $CTB_u$. The index of the selected block $CTB'r_i$ is transmitted in the data signal F.

With reference to FIG. 6C, the image $IC_j$ is a three-dimensional image comprising a first image component $CI_{1j}$ and a second image component $CI_{2j}$. The first image component $CI_{1j}$ is acquired in association with the second image component $CI_{2j}$. In the example shown, the coded and then decoded block $CTBr_i$ is selected in the first image component $CI_{1j}$. Such a component is considered as being the reference image component, i.e. the component that has previously been coded and then decoded in order to be used for coding the second image component $CI_{2j}$ in which the current block $CTB_u$ is situated. The index of the coded and then decoded block $CTBr_i$ is transmitted in the data signal F.

Such first and second image components may for example be respectively a texture component and an associated depth component, as implemented in the new video coding format known as multiview video plus depth (MVD) which is currently under development.

Alternatively, the above-mentioned first and second image components may be respectively a depth component and its associated texture component.

It is naturally possible to envisage using other types of first and second image component.

Thus, the first and second image components could respectively be:
two views of the same multiview image: or else
a luma component and a chroma component; or else
two different layers during scalable video coding.

It is also possible to envisage coding a first image component relative to a second image component and a third image component. By way of example, this might give:
the first image component may be a component Y;
the second image component may be a component U; and
the third image component may be a component V.

2. A Decoding Method

An implementation of the invention is described below in which the decoding method of the invention is used for decoding an image sequence in a binary stream similar to that obtained by coding in compliance, for example, with the HEVC 2D standard presently under development.

In this implementation, the decoding method of the invention is implemented for example in software or hardware manner by modifying a decoder that was initially in compliance with the HEVC 2D standard. The decoding method of the invention is shown in the form of an algorithm comprising steps D1 to D2 as shown in FIG. 7.

Figure 8:
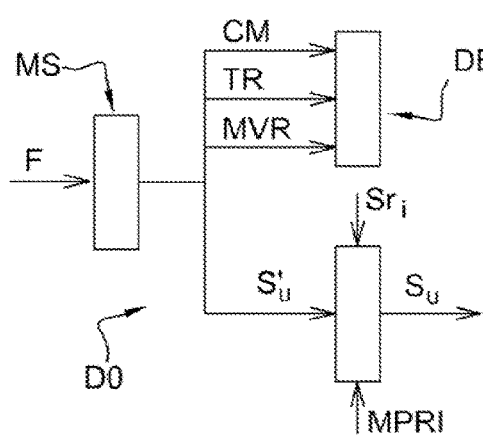
FIG. 8 shows an embodiment of a decoder device of the invention.

In the implementation of the invention, the decoding method of the invention is implemented in a decoder device DO as shown in FIG. 8, which device is adapted to receive the data signal F delivered by the coder CO of FIG. 3.

Figure 7:
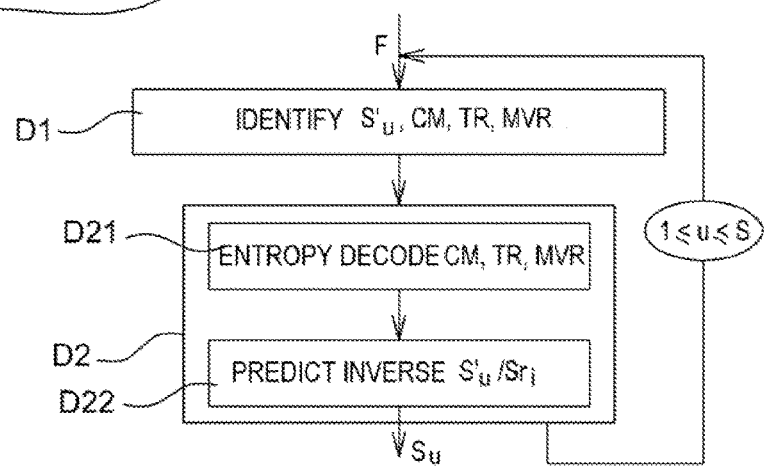
FIG. 7 shows steps of the decoding method of the invention.

During a step D1 shown in FIG. 7, the following items associated with the current block $CTB_u$ are identified in the data signal F: the sequence $S'_u$; the coding mode CM; the texture residuals TR; and the movement vector residuals MVR.

Such a step is performed by a selection software module MS, as shown in FIG. 8, which module is adapted to place a read pointer pointing to the signal F at the beginning of the data constituting the sequence $S'_u$.

During a step D2 shown in FIG. 7, a substep D21 is performed in conventional manner of entropic decoding of the following items associated with the current block $CTB_u$: the coding mode CM, the texture residuals TR, and the movement vector residuals MVR.

Such a step is performed by the entropic decoder module DE, as shown in FIG. 8.

During that same step D2 shown in FIG. 7, a substep D22 is performed of reconstructing the sequence $S_u$ representative of the partitioning of the current block $CTB_u$ on the basis of the sequence $Sr_i$ representative of the previously reconstructed partitioning of the decoded block $CTBr_i$ and on the basis of the sequence $S'_u$ as read. The sequence $Sr_i$ is previously reconstructed by an inverse prediction module MPRI as shown in FIG. 8.

More precisely, such reconstruction consists in performing prediction that is the inverse of the prediction performed in the prediction step C5 of FIG. 2.

For this purpose, the sequence $Sr_i$ representative of the previously reconstructed partitioning of the decoded block $CTBr_i$ is added to the sequence $S'_u$ as read, thereby providing the reconstructed sequence $S_u$ representative of the partitioning of the current block $CTB_u$.

The substeps D21 and D22 may be performed simultaneously, or alternatively they may be performed in either order.

The steps D1 and D2 are reiterated for all of the sequences $S'_1$ to $S'_S$ identified in the data signal F.

Naturally, the above-described implementations are given purely by way of non-limiting indication and numerous modifications may easily be applied thereto by the person skilled in the art without thereby going beyond the ambit of the invention.

The invention claimed is:

1. A method of coding a current image that has previously been partitioned into blocks, the method performing the following acts by a coder device for a current block that is to be coded:

partitioning the current block at least once into a plurality of subblocks; and representing the partitioning of the current block in the form of a first digital information sequence;

comparing the first digital information sequence representative of said partitioning of the current block to a second digital information sequence representative of a partitioning of a block that has already been coded and then decoded, a value of a first bit of said first digital information sequence being compared to a value of first bit of said second digital information sequence, and so on until a value of a last bit of each of said first and second digital information sequences, and then during said comparison, for two bits having the same respective position in said both first and second digital information sequences, if said two bits have not the same value, a bit is generated to indicate that a subblock resulting from the partitioning of the already coded and then decoded block and corresponding to a subblock resulting from the partitioning of the current block, has been partitioned again, if said two bits have the same value, deducing that neither a subblock of the current block, nor a corresponding subblock of the already coded and decoded block has been partitioned again, such that no bit is generated to indicate said deduction;

and in which:

for said bit generated, encoding said bit as generated; and transmitting to a decoder a data signal including said bit as generated.

2. The coding method according to claim 1, in which said data signal includes digital information indicating whether or not said comparing act has been performed.

3. The coding method according to claim 1, wherein the current block and the already coded and then decoded block are respectively partitioned at least once to obtain two partitioning depth levels ($k_1$, $k_2$) that are less than or equal to a predetermined partitioning depth level ($k_p$) wherein $k_1 \geq 0$, $k_2 \geq 0$, $k_p \geq 0$, and wherein a predetermined comparison criterion between the partitioning of said current block and the partitioning of said already coded and then decoded block is as follows:

comparing the partitioning of the current block and of the already coded and then decoded block at equal partitioning depth levels ($k_1$, $k_2$);

iterating said comparison to said predetermined partitioning depth level ($k_p$); and at the end of each comparison, determining digital information generating a bit either of a first value or else of a second value depending on whether the compared partitionings are respectively the same or different.

4. The coding method according to claim 1, wherein said comparison criterion is the following:

no bit is generated if a subblock resulting from the partitioning of the current block and a corresponding subblock resulting from the partitioning of the already coded and then decoded block have not been partitioned again; and one bit is generated if a subblock resulting from the partitioning of the current block has been partitioned again and if a corresponding subblock resulting from the partitioning of the already coded and then decoded block has or has not been partitioned again.

5. The coding method according to claim 1, wherein said comparison criterion is as follows:

no bit is generated if a subblock resulting from the partitioning of the current block and a corresponding subblock resulting from the partitioning of the already coded and then decoded block have been partitioned again;

one bit is generated if a subblock resulting from the partitioning of the current block and a corresponding subblock resulting from the partitioning of the already coded and then decoded block have not been partitioned again; and one bit is generated if a subblock resulting from the partitioning of current block has been partitioned again and if a corresponding subblock resulting from the partitioning of the coded and then decoded block has not been partitioned again.

6. The coding method according to claim 1, wherein the coded and then decoded block has a pre-identified position:

in a decoded portion of the current image; or else in another image that has already been decoded; or else in an image component associated with another image component in which the current block is situated.

7. A coder device for coding a current image that has previously been partitioned into blocks, said device comprising, for a current block that is to be coded:

partitioning means for partitioning the current block at least once into a plurality of subblocks; and representation means for representing the partitioning of the current block in the form of a first digital information sequence;

comparison means for comparing the first digital information sequence representative of said partitioning of the current block to a second digital information sequence representative of a partitioning of a block that has already been coded and then decoded, a value of a first bit of said first digital information sequence being compared to a value of a first bit of said second digital information sequence, and so on until a value of a last bit of each of said first and second digital information sequences, and then during said comparison, for two bits having the same respective position in said both first and second digital information sequences, if said two bits have not the same value, a bit is generated to indicate that a subblock resulting from the partitioning of the already coded and then decoded block and corresponding to a subblock resulting from the partitioning of the current block, has been partitioned again, if said two bits have the same value, deducing that neither a subblock of the current block, nor a corresponding subblock of the already coded and decoded block has been partitioned again, such that no bit is generated to indicate said deduction;

and in which:

for said bit generated, coder means for coding said generated bit, and transmitter means for transmitting to a decoder a data signal including said bit as generated.

8. A non-transmissible computer-readable medium comprising a computer program stored thereon and including instructions for performing a method of coding a current image that has previously been partitioned into blocks, when the program is executed by a processor, the method comprising the following acts for a current block that is to be coded:

partitioning the current block at least once into a plurality of subblocks; and representing the partitioning of the current block in the form of a first digital information sequence;

comparing the first digital information sequence representative of said partitioning of the current block to a second digital information sequence representative of a partitioning of a block that has already been coded and then decoded, a value of a first bit of said first digital information sequence being compared to a value of a first bit of said second digital information sequence, and so on until a value of a last bit of each of said first and second digital information sequences, and then during said comparison, for two bits having the same respective position in said both first and second digital information sequences, if said two bits have not the same value, a bit is generated to indicate that a subblock resulting from the partitioning of the already coded and then decoded block and corresponding to a subblock resulting from the partitioning of the current block, has been partitioned again, if said two bits have the same value, deducing that neither a subblock of the current block, nor a corresponding subblock of the already coded and decoded block has been partitioned again, such that no bit is generated to indicate said deduction;

and in which:

for the bit generated, encoding said bit as generated, and transmitting to a decoder a data signal including said bit as generated.

9. A method of decoding a data signal representative of a current image that has previously been partitioned into blocks and that has been coded, by performing initially reconstructing partitioning of a decoded block; in which for a current block to be decoded:

identifying, in said data signal, the presence or not of at least one bit representative of a comparison performed during coding between a first digital information sequence representing the partitioning of a current block and a second digital information sequence representing a partitioning of a decoded block, a value of a first bit of said first digital information sequence having been compared to a value of a first bit of said second digital information sequence, and so on until a value of a last bit of each of said first and second digital information sequences, in which said at least one bit as identified indicates that a subblock resulting from the partitioning of the decoded block and corresponding to a subblock resulting from the partitioning of the current block, has been partitioned again at the coding, no bit being identified if neither a subblock of the current block, nor a corresponding subblock of the decoded block has been partitioned again at the coding; and reconstructing the partitioning of the current block from said reconstructed partitioning of the decoded block as a result of said identification.

10. A decoder device for decoding a data signal representative of a current image that has previously been partitioned into blocks and that has been coded, the device comprising, reconstruction means for initially reconstructing partitioning of a decoded block; in which said decoder device comprises for a current block to be decoded:

identification means for identifying, in said data signal, the presence or not of at least one bit representative of a comparison performed on coding between a first digital information sequence representing the partitioning of a current block and a second digital information sequence representing a partitioning of a decoded block, a value of a first bit of said first digital information sequence having been compared to a value of a first bit of said second digital information sequence, and so on until a value of a last bit of each of said first and second digital information sequences, in which said at least one bit as identified indicates that a subblock resulting from the partitioning of the decoded block and corresponding to a subblock resulting from the partitioning of the current block, has been partitioned again at the coding, no bit being identified if neither a subblock of the current block, nor a corresponding subblock of the decoded block has been partitioned again at the coding; and said reconstruction means being suitable for reconstructing the partitioning of the current block from said reconstructed partitioning of the decoded block as a result of said identification.

11. A non-transmissible computer readable data medium storing a computer program including instructions for executing a method of decoding a data signal representative of a current image that has previously been partitioned into blocks and that has been coded, when the program is executed by a processor, wherein the method comprises performing initially reconstructing partitioning of a decoded block; and for a current block to be decoded:

identifying, in said data signal, the presence or not of at least one bit representative of a comparison performed during coding between a first digital information sequence representing the partitioning of a current block and a second digital information sequence representing a partitioning of a decoded block, a value of a first bit of said first digital information sequence having been compared to a value of a first bit of said second digital information sequence, and so on until a value of a last bit of each of said first and second digital information sequences, in which said at least one bit as identified indicates that a subblock resulting from the partitioning of the decoded block and corresponding to a subblock resulting from the partitioning of the current block, has been partitioned again at the coding, no bit being identified if neither a subblock of the current block, nor a corresponding subblock of the decoded block has been partitioned again at the coding; and reconstructing the partitioning of the current block from said reconstructed partitioning of the decoded block as a result of said identification.

* * * * *

UNITED STATES PATENT AND TRADEMARK OFFICE
CERTIFICATE OF CORRECTION

PATENT NO. : 10,893,268 B2
APPLICATION NO. : 14/413977
DATED : January 12, 2021
INVENTOR(S) : Joel Jung et al.

It is certified that error appears in the above-identified patent and that said Letters Patent is hereby corrected as shown below:

In the Claims

In Claim 3, Column 19, Lines 30-31:
Please delete "determining digital information".

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*